(12) United States Patent
Mann et al.

(10) Patent No.: US 8,867,468 B2
(45) Date of Patent: Oct. 21, 2014

(54) JOINT UPLINK DATA PROCESSING BY PLURAL BASE STATIONS

(75) Inventors: Karl D. Mann, Nepean (CA); Ping Yu, Nepean (CA); Jianguo Long, Kanata (CA); Donald Brinkhurst, Nepean (CA); Roger Mah, Nepean (CA)

(73) Assignee: Apple Inc., Cupertino, CA (US)

( * ) Notice: Subject to any disclaimer, the term of this patent is extended or adjusted under 35 U.S.C. 154(b) by 151 days.

(21) Appl. No.: 13/501,166

(22) PCT Filed: Oct. 13, 2010

(86) PCT No.: PCT/IB2010/002614
§ 371 (c)(1),
(2), (4) Date: Apr. 10, 2012

(87) PCT Pub. No.: WO2011/045658
PCT Pub. Date: Apr. 21, 2011

(65) Prior Publication Data
US 2012/0195284 A1    Aug. 2, 2012

Related U.S. Application Data

(60) Provisional application No. 61/252,240, filed on Oct. 16, 2009.

(51) Int. Cl.
*H04W 28/08* (2009.01)
*H04W 28/16* (2009.01)
*H04W 92/20* (2009.01)
*H04W 88/08* (2009.01)

(52) U.S. Cl.
CPC .............. *H04W 28/16* (2013.01); *H04W 92/20* (2013.01); *H04W 88/08* (2013.01)
USPC ......................................................... 370/329

(58) Field of Classification Search
CPC ...... H04W 92/16; H04W 88/08; H04B 7/022; H04B 7/024; H04B 7/026; H04J 11/0053
USPC .............. 455/447, 452, 452.2, 500, 501, 522, 455/63.1, 67.11, 67.13, 69, 452.1, 422.1; 370/329, 327, 318, 328, 336; 375/259–260
See application file for complete search history.

(56) References Cited

U.S. PATENT DOCUMENTS

2010/0027471 A1*   2/2010   Palanki et al. ................ 370/328
2010/0104033 A1*   4/2010   Gorokhov ..................... 375/260

(Continued)

FOREIGN PATENT DOCUMENTS

WO   2007112143        10/2007
WO   2008009781 A1     1/2008
WO   2010145861 A1     12/2010

OTHER PUBLICATIONS

Jiang et al., "Uplink Coordinated Multi-Point Reception for LTE-Advanced Systems", 5th International Conference on Wireless Communications, Networking and Mobile Computing, 2009 (WiCom '09), (Sep. 24-26, 2009) consisting of 4-pages.

(Continued)

*Primary Examiner* — Charles C Jiang
*Assistant Examiner* — Rose Clark
(74) *Attorney, Agent, or Firm* — Meyertons, Hood, Kivlin, Kowert & Goetzel, P.C.

(57) ABSTRACT

Joint uplink processing by plural base stations includes sending, by a serving base station, a request for uplink resources of a second base station for receiving uplink data of a mobile station. The serving base station receives first uplink data from the mobile station, and the serving base station further receives (from the second base station) second uplink data of the mobile station received by the second base station using the uplink resources specified by the request.

20 Claims, 4 Drawing Sheets

(56) References Cited

U.S. PATENT DOCUMENTS

| | | | |
|---|---|---|---|
| 2010/0105404 A1* | 4/2010 | Palanki et al. | 455/450 |
| 2010/0323611 A1* | 12/2010 | Choudhury | 455/7 |
| 2010/0323712 A1* | 12/2010 | Guey et al. | 455/452.2 |
| 2011/0098054 A1* | 4/2011 | Gorokhov et al. | 455/452.1 |
| 2011/0237272 A1* | 9/2011 | Gorokhov et al. | 455/452.1 |
| 2012/0120927 A1* | 5/2012 | Bucknell | 370/336 |
| 2012/0134429 A1* | 5/2012 | Hoymann et al. | 375/259 |

OTHER PUBLICATIONS

Zheng et al., "Coordinated multi-point transmission and reception for LTE-Advanced", 5th International Conference on Wireless Communications, Networking and Mobile Computing, Section III (Sep. 24-26, 2009) consisting of 4-pages.

TSG-RAN WG1 #53 (R1-082024), "A discussion on some technology components for LTE-Advanced," Source: Ericsson, Kansas City, MO, USA, (May 5-9, 2008) (Retrieved from the Internet: http://www.3gpp.org/ftp/tsg_ran/wg1_r11/TSGR1_53/Docs/), Section 2.4 consisting of 11-pages.

TSG-RAN WG1 #53bis (R1-082469), "LTE-Advanced-Coordinated Multipoint Transmission/Reception," Source: Ericsson, Warsaw, Poland, (Jun. 30-Jul. 4, 2008) Section 2, (Retrieved from the Internet: http:/.www.3gpp.org/ftp/tsg_ran/wg1_r11/TSGR1_53b/Docs/) consisting of 6-pages.

International Search Report and Written Opinion dated Feb. 23, 2011 for International Application No. PCT/IB2010/002614, International Filing Date: Oct. 13, 2010 consisting of 12-pages.

Office Action from Japanese Patent Application No. 2012533707, mailed Apr. 7, 2014, English and Japanese versions, pp. 1-10.

Alcatel-Lucent Shanghai Bell, Alcatel-Lucent, Efficient uplink coordinated multi-point reception with reduced backhauling cost, 3GPP TSG-RAN WG1#57, R1-092146, Apr. 28, 2009, pp. 1-5.

Huawei, System performance evaluation for uplink CoMP, 3GPP TSG-RAN WG1#56b, R1-091618, Mar. 28, 2009, pp. 1-10.

* cited by examiner

JOINT UPLINK DATA PROCESSING BY PLURAL BASE STATIONS

CROSS-REFERENCE TO RELATED APPLICATIONS

This application is a Submission Under 35 U.S.C. §371 for U.S. National Stage Patent Application of International Application No: PCT/IB2010/002614, filed Oct. 13, 2010 entitled JOINT UPLINK DATA PROCESSING BY PLURAL BASE STATIONS, which claims priority to U.S. Provisional Application Ser. No. 61/252,240, filed Oct. 16, 2009, entitled SYSTEM FOR INTER-NODEB JOINT PROCESSING OF 3GPP LTE UPLINK SIGNALS, the entirety of both which are incorporated herein by reference.

BACKGROUND

Various wireless access technologies have been proposed or implemented to enable mobile stations to perform communications with other mobile stations or with wired terminals coupled to wired networks. Examples of wireless access technologies include GSM (Global System for Mobile communications) and UMTS (Universal Mobile Telecommunications System) technologies, defined by the Third Generation Partnership Project (3GPP); and CDMA 2000 (Code Division Multiple Access 2000) technologies, defined by 3GPP2. CDMA 2000 defines one type of packet-switched wireless access network, referred to as the HRPD (High Rate Packet Data) wireless access network.

Another more recent standard that provides packet-switched wireless access networks is the Long Term Evolution (LTE) standard from 3GPP, which seeks to enhance the UMTS technology. The LTE standard is also referred to as the EUTRA (Evolved Universal Terrestrial Radio Access) standard. The EUTRA technology is considered to be fourth generation (4G) technology, to which wireless network operators are migrating to provide enhanced services. Another alternative 4G wireless technology is WiMAX (Worldwide Interoperability for Microwave Access), as defined by IEEE 802.16. Other wireless technologies also exist.

SUMMARY

In general, according to some embodiments, a method or system of performing a joint uplink processing by plural base stations includes sending, by a serving base station, a request for uplink resources of a second base station for receiving uplink data of a mobile station. The serving base station receives first uplink data from the mobile station, and the serving base station further receives (from the second base station) second uplink data of the mobile station received by the second base station using the uplink resources specified by the request.

Other or alternative features will become apparent from the following description, from the drawings, and from the claims.

BRIEF DESCRIPTION OF THE DRAWINGS

Some embodiments are described with respect to the following figures.

DETAILED DESCRIPTION

Figure 1:
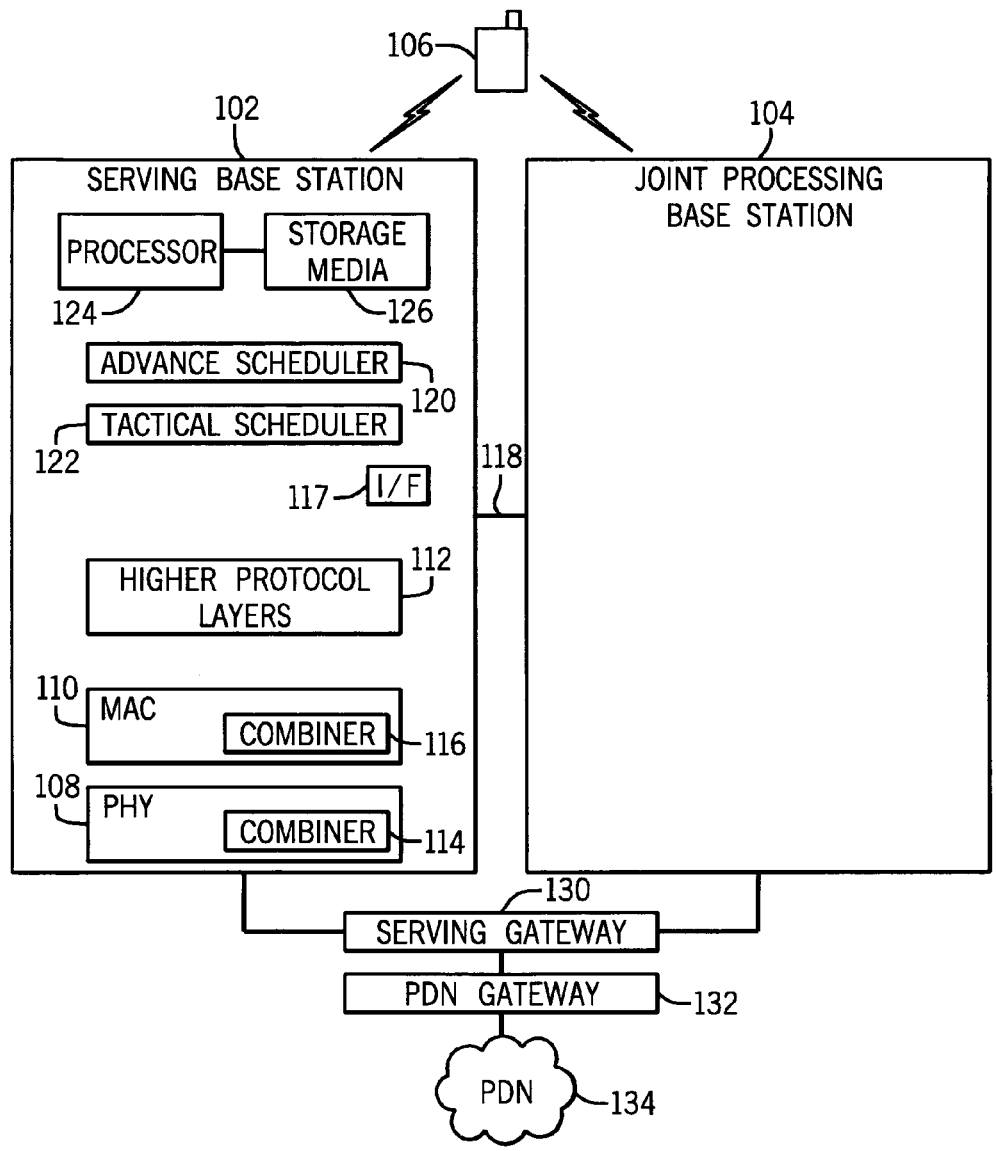
FIG. 1 is a block diagram of an example of an arrangement that includes multiple base stations in which some embodiments can be incorporated.

When a mobile station is in a region of a cell in which the strength of wireless signaling between the base station of the cell and a mobile station is relatively weak, wireless communication can be unreliable. Weak signaling can result in dropped data. Alternatively, the data rate used has to be decreased to improve reliability of wireless communications—however, reducing data rate comes at the expense of slower communications between the mobile station and base station.

In some embodiments, to improve wireless communications with a mobile station, inter-base station joint processing of uplink data from the mobile station can be performed. In response to scheduling of uplink transmission by a serving base station (where a "serving base station" is the base station currently serving a particular mobile station to allow the mobile station to communicate in the wireless network), the mobile station transmits uplink data to the serving base station. One or more neighboring base stations can assist with receiving the uplink data from the mobile station, and to share results of such received uplink data with the serving base station. These one or more neighboring base stations that assist with receiving the uplink data from the mobile station are referred to as joint processing base stations. By forwarding received uplink data from a joint processing base station to the serving base station, the likelihood of the serving base station being able to recover the actual uplink data sent by the mobile station is improved. At the serving base station, the uplink data received directly by the serving base station from the mobile station is combined with uplink data of the mobile station forwarded from a joint processing base station(s). The combined uplink data based on uplink data received by the serving base station and the joint processing base station(s) is used to derive actual uplink data sent by the mobile station.

An issue of performing inter-base station joint processing of uplink data is that there is latency of communication between the cooperating base stations. Such latency can prevent effective joint processing of uplink data from a mobile station.

In accordance with some embodiments, to allow for joint processing of uplink data even in the presence of inter-base station communication delays, an advance scheduler (provided at a base station) can be used that plans and communicates strategic joint processing requests. The advance scheduler performs tasks that are distinct from tasks performed by a "normal" scheduler of a base station, which is also referred to as a "tactical" scheduler (where the normal or tactical scheduler performs typical scheduling tasks on behalf of mobile stations).

An advance scheduler in a serving base station is able to submit a joint processing request to a joint processing base station (which is to cooperate with the serving base station to receive uplink data from a mobile station), where the joint processing request can inform the joint processing base station of uplink resources of the joint processing base station that the serving base station intends to use. The joint processing request is sent to the tactical scheduler of the joint processing base station. The tactical scheduler in the joint processing base station can choose whether or not to schedule assistance based on predefined rules. For example, the joint processing base station can choose not to schedule assistance in receiving uplink data from the mobile station based on a comparison of the SINR (signal-to-interference-plus-noise ratio) of the joint processing base station (the SINR of wireless communication with a particular mobile station) with the SINR of the serving base station. For example, if the SINR of the joint processing base station is worse than the SINR of the serving base station by some predefined threshold, then the joint processing base station would not offer assistance. This rule can also be known beforehand to the serving base station—in other words, if the serving base station determines that the SINR of the joint processing base station is worse than the SINR of the serving base station by the predefined threshold, then the serving base station knows not to expect assistance in receiving uplink data from the joint processing base station. By using predefined rule(s) in performing joint processing of uplink data, the cooperating base stations can predict actions of each other without requiring the cooperating base stations to actually exchange signaling to make the determination of whether the cooperating base stations can jointly process mobile station uplink data, which can be associated with significant inter-node communication delays.

Instead of using SINR relative to a predefined threshold, other indicators of relative strengths of noise and signaling can be employed.

In addition, a deterministic rule can also be specified when requests for resources collide. For example, if the serving base station requests uplink resources of the joint processing base station that would cause collision with other requests already made of the joint processing base station, then the deterministic rule can specify how such a collision would be resolved.

Although reference is made to cooperation between a serving base station and one joint processing base station, it is noted that the serving base station can cooperate with multiple joint processing base stations to receive uplink data of a mobile station. Note that base station can refer to any wireless system, for example interlinked wireless LANs.

By employing uplink data joint processing according to some embodiments, wireless communication with a mobile station in a region of weak signaling is improved. Examples of such a region of weak signaling can include the edge of a cell, or alternatively, a region in which there are significant obstructions to wireless signaling. Moreover, by employing techniques according to some embodiments, improved data rates (for uplink data) can be achieved such that an increased number of regions of a coverage area can support a high data rate. Also, the average cell capacity can be increased using techniques according to some embodiments.

FIG. 1 is a schematic diagram of an example system that has a serving base station 102 and one or multiple joint processing base stations 104. In the ensuing discussion, reference is made to cooperation between the serving base station 102 (which serves a mobile station 106) and one joint processing base station 104. It is noted that techniques discussed are applicable to a situation in which the serving base station 102 cooperates with multiple joint processing base stations 104.

The base stations 102 and 104 are used to communicate wireless signaling with various mobile stations in respective coverage regions of the corresponding base stations, where these coverage regions can also be referred to as cells. A "cell" can refer to an entire cell, a cell sector, or any segment of a cell.

The serving base station 102 includes a physical layer 108 and a medium access control (MAC) layer 110. The physical layer 108 provides the lowest level interface to physical transmission media, which in this case is the wireless link between the serving base station 102 and the mobile station 106. The MAC layer 110 provides an interface between the physical layer 108 and a higher protocol layer (which is part of higher protocol layers 112 depicted in FIG. 1).

As further shown in FIG. 1, the physical layer 108 and/or the MAC layer 110 can each include a respective combiner 114 or 116 (note that just one of the combiners 114 and 116 can be provided in some examples, while in other examples both combiners 114 and 116 can be present). The combiner 114 or 116 is used to combine uplink data of the mobile station 106 received by the receiving base station 102 and by the joint processing base station 104. Effectively, the combiner 114 or 116 combines uplink data received directly from the mobile station 106 by the serving base station 102, with uplink data of the mobile station 106 received by the joint processing base station 104 and forwarded to the serving base station 102 over a link 118 between the serving base station 102 and joint processing base station 104 (such as by using an interface 117 in the serving base station 102 and a similar interface in the joint processing base station 104). The combined uplink data can be used to derive the actual uplink data sent by the mobile station 106.

Note that the joint processing base station(s) 104 can each include the same components as shown in the serving base station 102. Although the base station 102 is the serving base station for the mobile station 106, it is noted that one of the base station(s) 104 can be the serving base station for another mobile station, and the base station 102 can be a joint processing base station for such other mobile station.

In accordance with some embodiments, the serving base station 102 includes an advance scheduler 120 and a tactical scheduler 122. The tactical scheduler 122 is the scheduler that actually schedules resources for communication with the mobile station 106, where the scheduled resources include uplink resources and downlink resources.

The advance scheduler 120 is provided to allow for more efficient joint processing of uplink data from the mobile station 106. The advance scheduler 120 is able to issue a joint processing request to the joint processing base station 104, to request uplink resources of the joint processing base station 104 that the serving base station 102 wishes to use for receiving uplink data from the mobile station 106 for purposes of joint uplink processing.

By performing combining of uplink data (of the mobile station 106) at the physical layer 108 or MAC layer 110, enhanced efficiency can be provided to upper layers of the serving base station, since the upper layers would not have to be involved in performing the actual combining of uplink data. Also, the mobile station 106 would not have to be reconfigured to enable joint uplink processing, which reduces implementation costs.

The serving base station 102 also includes a processor (or multiple processors) 124, which is connected to storage media 126 (e.g., volatile memory device such as a static or dynamic random access memory and/or persistent storage device such as a disk-based storage device or flash memory). The advance scheduler 120 and tactical scheduler 122 can be implemented with machine-readable instructions executable on the processor(s) 124.

In accordance with some implementations, the base stations 102 and 104 can be according to the Long Term Evolution (LTE) standard, as defined by the Third Generation Partnership Project (3GPP). The LTE standard is also referred to as the EUTRA (Evolved Universal Terrestrial Radial Access) standard.

Although reference is made to the EUTRA standard, it is noted that alternative embodiments can employ other wireless protocols. Thus, techniques as discussed herein can also be applied to joint uplink processing by base stations according to other wireless protocols, including any one or more of the following: WiMAX (Worldwide Interoperability for Microwave Access), as defined by IEEE 802.16; CDMA (Code Division Multiple Access), as defined by 3GPP2; HRPD (High Rate Packet Data), as defined by 3GPP2; UMTS (Universal Mobile Telecommunication System), as defined by 3GPP; EDGE (Enhanced Data Rates for GSM Evolution), as defined by 3GPP; GSM (Global System for Mobile), as defined by 3GPP; Wireless Local Area Network (WLAN), as defined by IEEE 802.11; and so forth.

In the ensuing discussion, reference is made to the EUTRA standard—it is noted that in other implementations, other standards can be employed.

According to the EUTRA standard, the base station 102 or 104 is implemented as an enhanced node B (ENode B). A base station can perform one or more of the following tasks: radio resource management, mobility management of mobile stations, routing of traffic, and so forth. Generally, the term "base station" can refer to a cellular network base station or access point used in any type of wireless network, or any type of wireless transmitter/receiver to communicate with mobile station. The term "base station" can also encompass an associated controller, such as a base station controller or a radio network controller. It is contemplated that the term "base station" also refers to a femto base station or access point, a micro base station or access point, or a pico base station or access point. A "mobile station" can refer to a telephone handset, a portable computer, a personal digital assistant (PDA), or an embedded device such as a health monitor, attack alarm, and so forth.

As further shown in FIG. 1, the base stations 102 and 104 can be connected to a serving gateway 130, which is used for routing bearer data packets. The serving gateway 130 also acts as a mobility anchor for the user plane during handovers between different base stations. The serving gateway 130 is also connected to a packet data network (PDN) gateway 132, which provides connectivity between a mobile station and a packet data network 134 (e.g., the Internet, a network that provides various services, etc.).

Reference to the EUTRA standard is intended to refer to the current EUTRA standard, as well as any standard that evolves over time from the EUTRA standard. It is expected that a future standard that evolved from the EUTRA standard may be referred to by a different name. It is contemplated that reference to "EUTRA" is intended to cover such subsequently evolved standard(s) as well.

Figure 2:
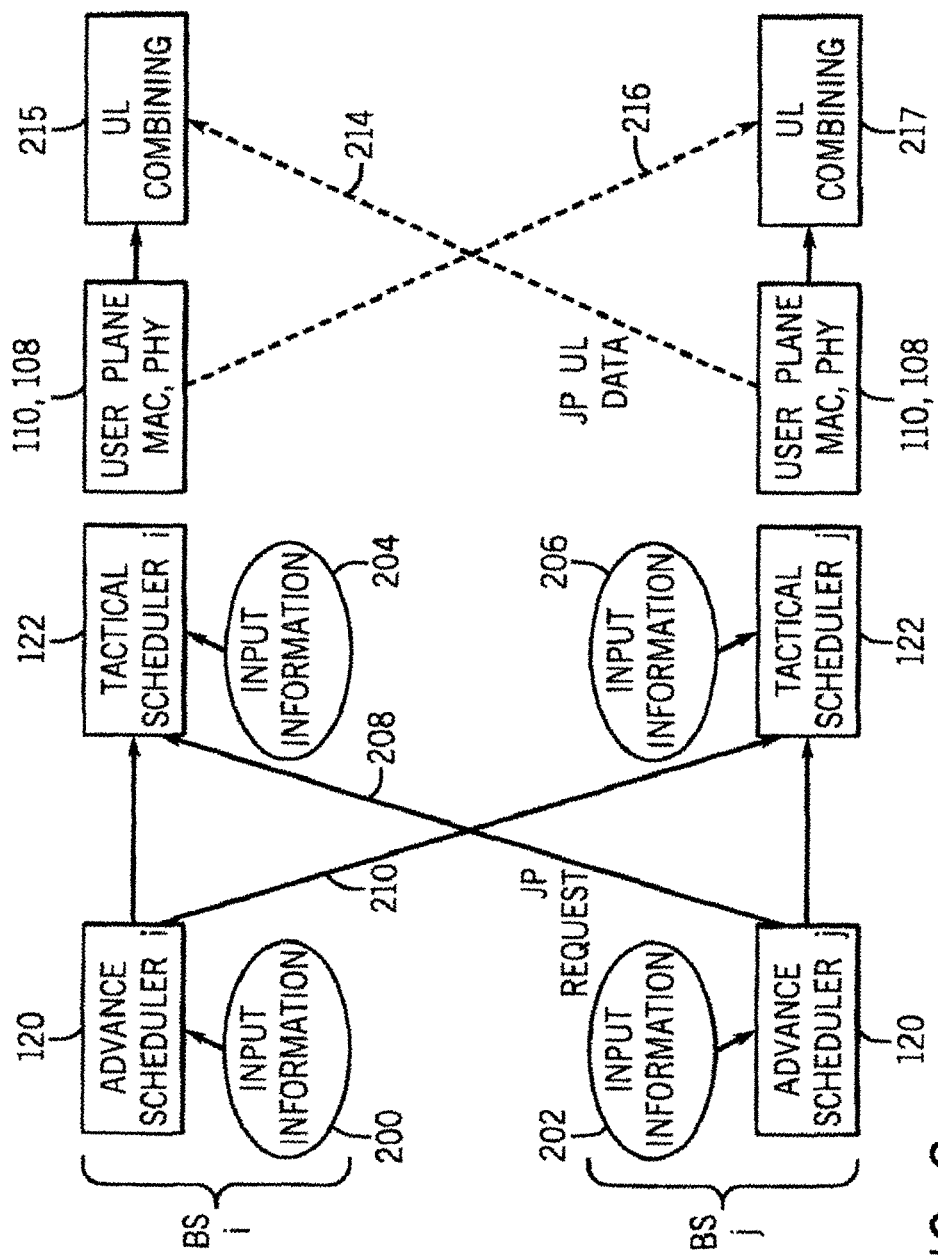
FIG. 2 is a block diagram of example logic implemented in base stations according to some embodiments.

FIG. 2 illustrates various components of base station i and base station j, which can correspond to base station 102 and 104 in FIG. 1, for example. One of the base station i and base station j can be the serving base station, while the other base station is the joint processing base station. Input information 200 and 202 are provided to each of respective advance scheduler i and advance scheduler j (contained in base station i and base station j, respectively). The input information 200 or 202 includes a sounding reference signal (SRS) (transmitted by a mobile station so that the base station can use the SRS to estimate the uplink channel quality and other information); reports (containing various data of interest to the advance scheduler i or j); buffer occupancy (indicating the occupancy of a buffer associated with a mobile station); and QoS information (quality of service information to indicate the quality of service to be provided for a particular transmission). It is noted that similar information (204 and 206) can also be provided to the tactical scheduler i and tactical scheduler j, respectively.

As further depicted in FIG. 2, the advance scheduler j in base station j can send a joint processing request (208) to the tactical scheduler i in base station i. This would be performed in the situation where the base station j is the serving base station, and base station i is the joint processing base station. The joint processing request is based on advance scheduling performed by the advance scheduler ahead of actual scheduling performed by a tactical scheduler in the serving base station.

Similarly, the advance scheduler i in base station i can send a joint processing request (210) to the tactical scheduler j in base station j, in the situation where base station i is the serving base station and base station j is the joint processing base station.

A joint processing request can specify assignment of uplink resources of a joint processing base station (on behalf of the serving base station) to use for receiving uplink data from a particular mobile station by the joint processing base station. Other content contained in the joint processing request can include, as examples, the identification of the mobile station, a radio network temporary identifier (RNTI), a modulation and coding scheme (MCS) (to specify the modulation and coding to be used for improved signal quality), and/or other information.

It is noted that the serving base station can also send a joint measurement request (not shown in FIG. 2) to the joint processing base station, for the purposes of measuring signaling for particular uplink resources. This allows the serving base station (and the joint processing base station) to know the relative SINRs such that a determination can be made, based on the SINRs, whether the joint processing base station should schedule assistance for receiving uplink data from the mobile station.

As further depicted in FIG. 2, if base station j is the joint processing base station, the user plane MAC layer 110 and physical layer 108 of base station j can send joint processing uplink data (214) to the serving base station i to perform uplink data combining (215). Alternatively, if base station i is the joint processing base station, then the user plane MAC layer 110 and physical layer 108 of base station i can send joint processing uplink data (216) to the serving base station j to perform uplink data combining (217).

Figure 3:
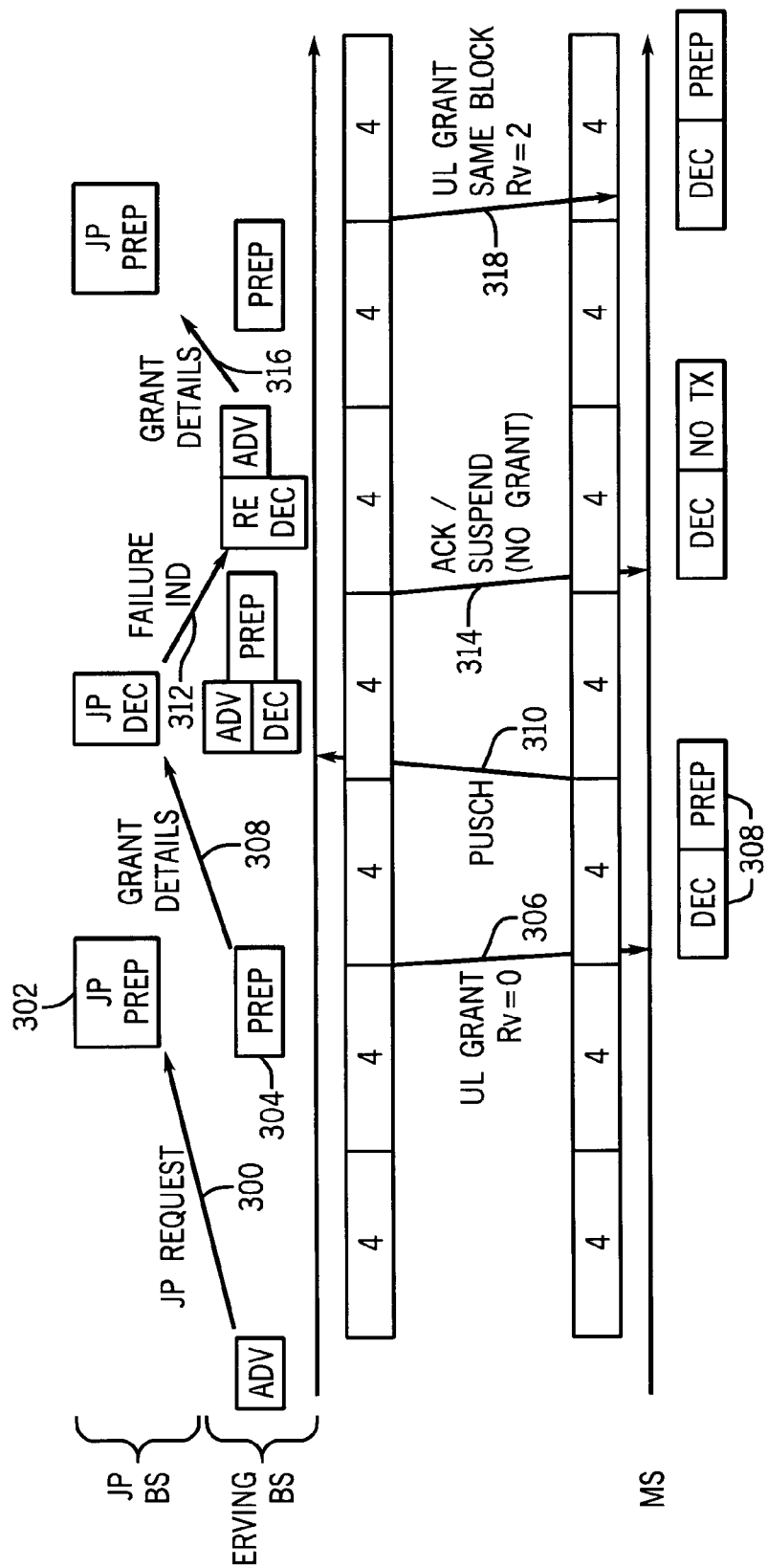
FIGS. 3 and 4 are timing diagrams to illustrate operation of a serving base station and a joint processing base station, according to some embodiments.

FIG. 3 is a timing diagram of relating to joint uplink processing according to some examples. The timing diagram of FIG. 3 shows a sequence of time blocks, where each block has four TTIs (transmission time intervals), and each TTI represents a time slot of a predefined length.

In the timing diagram of FIG. 3, "ADV" represents tasks performed by the advance scheduler (120 in FIG. 1) of the serving base station, "PREP" represents tasks performed by a base station or mobile station to allow for communication of uplink data from the mobile station to a base station, and "DEC" represents decoding tasks.

In some implementations, it is assumed that hybrid ARQ (automatic repeat request) is used, where error detection information bits and forward error correction bits are added to data to be transmitted over the error. The HARQ information, including the error-detection bits and forward error correction bits, allows for the receiver to determine whether data received by the receiver contains an error. The forward error correction bits allow for correction of certain data errors. If a data error is not correctable, then HARQ provides for a mechanism to request for retransmission of data from the transmitter.

In other implementations, other error detection and correction mechanisms can be employed for wireless communications between a mobile station and a base station.

As depicted in FIG. 3, when joint uplink processing is to be performed, the advance scheduler 120 in the serving base station (after performing ADV tasks) sends a joint processing request (300) to the tactical scheduler 122 in the joint processing base station, which performs tasks represented as "JP PREP." As noted above, the joint processing request (300) can specify resource blocks of the joint processing base station that may be requested of the joint processing base station for receiving uplink data from the mobile station for purposes of performing joint uplink processing. Note that at this stage, the joint processing request merely indicates that the serving base station intends to schedule uplink data transmission on these resource blocks of the joint processing base station—that may not occur based on various conditions.

At a later point in time, the tactical scheduler in the serving base station performs PREP tasks 304 to send an uplink grant message (306) to the mobile station. Grant details are also sent (308) to the tactical scheduler of the joint processing base station, which indicates to the joint processing base station that the serving base station did in fact schedule the resource blocks specified by the joint processing request (300).

In the example of FIG. 3, the uplink grant (306) is sent with RV (redundancy version) set to zero. RV is an HARQ parameter that is used to specify which retransmission version to use. RV is used for indicating whether a previously transmitted block is to be resent by the mobile station, or the mobile station can perform the transmission of the next uplink data. In the example, RV equals zero indicates that the mobile station can send the next uplink data.

In response to the uplink grant (306), the mobile station performs various tasks 308, and sends (310) uplink data on a physical uplink shared channel (PUSCH) to the serving base station and the joint processing base station. Note that the uplink grant (306) specified that the mobile station is to use radio resources of both the serving base station and the joint processing base station, such that the uplink data sent by the mobile station (at 310) can be received by both the serving base station and joint processing base station for joint uplink processing.

Upon receipt of the uplink data on the PUSCH, both the serving base station and joint processing base station performs respective tasks (JP DEC, ADV, DEC, PREP) based on the received uplink data. In the example of FIG. 3, it is assumed that the joint processing base station is unable to successfully decode the uplink data received in the PUSCH—as a result, the joint processing base sends a failure indication (312) to the serving base station. Note that it may be unclear whether or not reception of uplink data is successful or not at the moment that HARQ feedback is to be provided by the serving base station to the mobile station. As a result, in accordance with some embodiments, an acknowledgement (ACK) (314) is provided without an uplink grant. Instead, the ACK is provided with a suspend indication, which is sent to the mobile station. In response to the ACK with suspend indication (314), the mobile station does not perform uplink data transmission. Effectively, the ACK with the suspend indication effectively delays provision of the HARQ feedback from the serving base station to the mobile station until the serving base station is able to determine whether or not the joint processing base station is able to cooperate with the serving base station to process the joint uplink data so that the serving base station can successfully decode the uplink data.

In the example of FIG. 3, it is assumed that in view of the failure indication (312) from the joint processing base station, and also in view of the fact that the serving base station is unable to successfully decode the uplink data received at 310, that the serving base station will request retransmission of the same uplink data sent at 310. The serving base station sends (at 316) grant details regarding the retransmission request to the joint processing base station, and the serving base station in addition sends (at 318) an uplink grant to the mobile station with RV set equal to 2. This is a request for a retransmission of the same uplink data previously transmitted by the mobile station.

Figure 4:
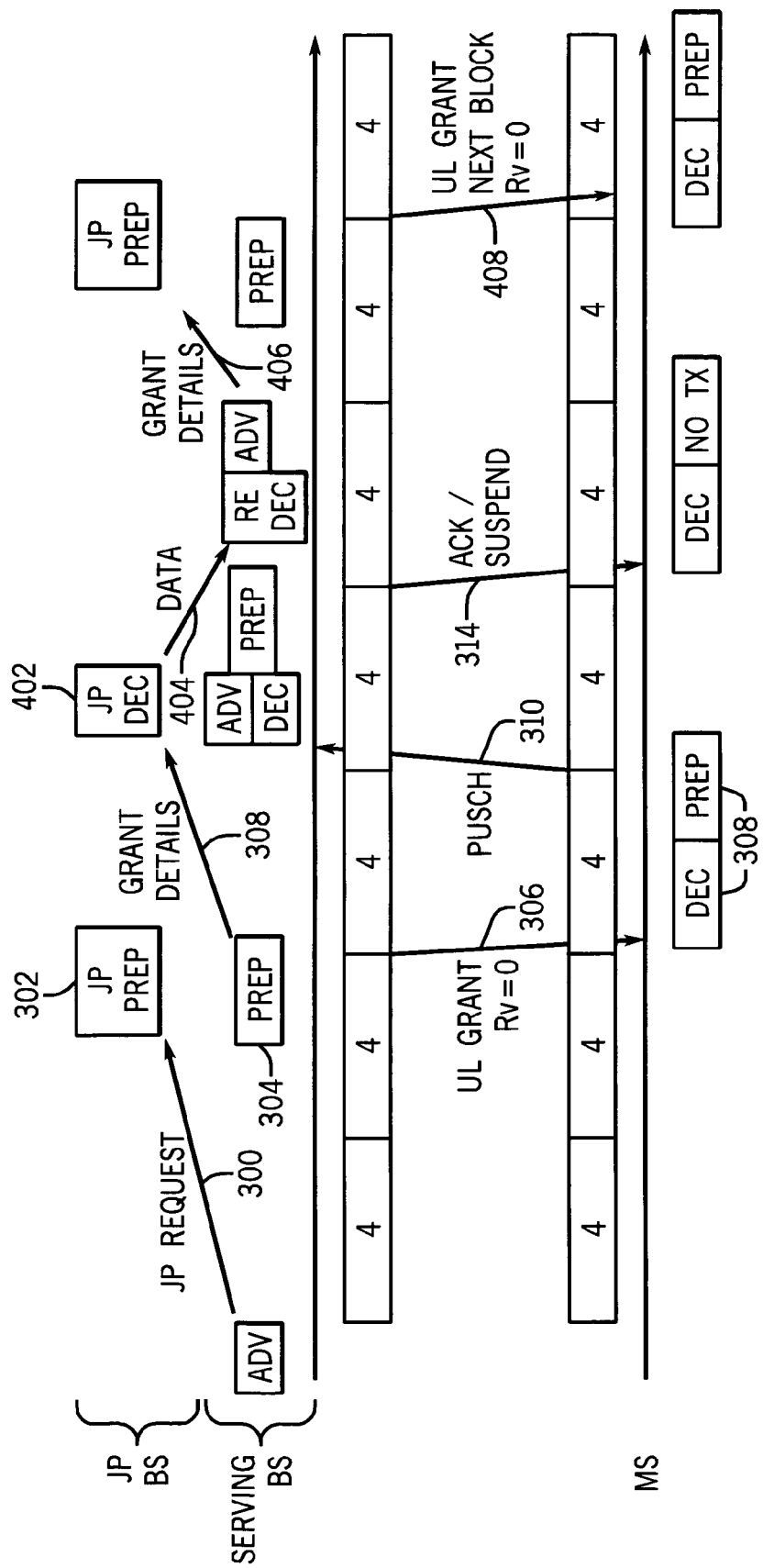

FIG. 4 is a timing diagram that is similar to the timing diagram of FIG. 3, except that the joint processing base station is able to successfully decode the uplink data sent at 310. Tasks that are the same as the tasks of FIG. 3 are assigned the same reference numerals in FIG. 4. As indicated in FIG. 4, the decoding (402) performed by the joint processing base station in response to the uplink data on PUSCH received at 310 results in successful decoding, which causes the joint processing base station to send the uplink data (at 404) to the serving base station. At the serving base station, such uplink data forwarded by the joint processing base station (404) can be combined with the uplink data received directly (310) by the serving base station from the mobile station, which results in a determination at the serving base station that the uplink data sent at 310 has been received successfully. As a result, the serving base station is able to schedule transmission of the next uplink data from the mobile station, and the serving base station sends grant details (406) regarding such scheduling of the next uplink data from the mobile station to the joint processing base station. The serving base station also sends an uplink grant (408) with RV equal zero to indicate to the mobile station that the mobile station is to send the next uplink data.

In FIG. 4, it is noted that even though data was successfully decoded by the joint processing base station, and that ultimately the serving base station was able to successfully decode the uplink data received at 310, at the point where HARQ feedback is needed, the serving base station is not yet able to send an uplink grant for the next uplink data from the mobile station. As a result, even in the FIG. 4 example, the serving base station sends an acknowledge (ACK) with suspend indication (314).

In the examples of FIGS. 3 and 4, it is assumed that the joint processing base station is able to offer assistance for joint processing of uplink data. In other examples, the tactical scheduler in the joint processing base station can choose whether or not to schedule assistance based on predefined rules. For example, the joint processing base station can choose not to schedule assistance in receiving uplink data from the mobile station based on a comparison of the SINR of the joint processing base station with the SINR of the serving base station. For example, if the $SINR_j$ of the joint processing base station j is worse than the $SINR_i$ of the serving base station I by some predefined threshold T ($SINR_j < SINR_i - T$), then the joint processing base station would not offer assistance. This rule can also be known beforehand to the serving base station—in other words, if the serving base station determines that the $SINR_j$ of the joint processing base station is worse than the $SINR_i$ of the serving base station by the predefined threshold, then the serving base station knows not to expect assistance in receiving uplink data from the joint processing base station.

By using predefined rule(s) in performing joint processing of uplink data, the cooperating base stations can predict actions of each other without requiring the cooperating base stations to actually exchange signaling to make the determination of whether the cooperating base stations can jointly process mobile station uplink data, which can be associated with significant inter-node communication delays.

If the joint processing base station chooses not to schedule assistance in response to the joint processing request, the joint processing base station can report that decision to the serving base station, so that the serving base station knows not to expect help from the joint processing base station. In other examples, the serving base station may already know that no help is expected from the joint processing base station, even without any feedback from the joint processing base station, since both the serving and joint processing base stations employ the same rule(s) in determining whether or not the joint processing base station should offer assistance for joint uplink data processing.

Using techniques or mechanisms according to some embodiments, bi-directional negotiation for performing joint processing of uplink data by multiple base stations can be avoided to reduce latency. Instead, predefined rules are used to govern behavior in performing uplink data joint processing.

Machine-readable instructions (such as instructions of the advance scheduler 120 and tactical scheduler 122 of FIG. 1) are loaded for execution on one or more processors (such as 124 in FIG. 1). A processor can include a microprocessor, microcontroller, processor module or subsystem, programmable integrated circuit, programmable gate array, or another control or computing device.

Data and instructions are stored in respective storage devices, which are implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method of performing joint uplink processing by plural base stations, comprising:
   sending, by a serving base station, a request for uplink resources of a second base station for receiving uplink data of a mobile station, wherein sending the request is performed by an advance scheduler in the serving base station, the request being based on advance scheduling performed by the advance scheduler ahead of actual scheduling performed by a tactical scheduler in the serving base station;
   receiving, by the serving base station, first uplink data from the mobile station;
   receiving, by the serving base station from the second base station, second uplink data of the mobile station received by the second base station using the uplink resources specified by the request; and
   combining, by the serving base station, the first uplink data with the second uplink data received from the second base station to derive actual uplink data sent by the mobile station.

2. The method of claim 1, wherein sending the request comprises sending the request to a tactical scheduler of the second base station to enable the second base station to schedule resources for uplink communications from the mobile station, wherein the scheduling of the resources by the second base station considers the uplink resources specified by the request.

3. The method of claim 1, further comprising:
   sending, by the serving base station, an uplink grant to the mobile station to assign uplink resources for the mobile station to send the first uplink data; and
   receiving, by the serving base station, the first uplink data on the uplink resources assigned by the uplink grant.

4. The method of claim 3, further comprising:
   sending, by the serving base station, a suspend indication in response to receiving the first uplink data; and
   after sending the suspend indication, sending, by the serving base station to the mobile station, a request for retransmission of the first uplink data if actual uplink data cannot be recovered from combining the first and second uplink data.

5. The method of claim 3, further comprising:
   sending, by the serving base station, a suspend indication in response to receiving the first uplink data; and
   after sending the suspend indication, sending, by the serving base station, an uplink grant to the mobile station to enable the mobile station to transmit next uplink data, in response to the serving base station being able to successfully decode actual uplink data of the mobile station.

6. The method of claim 1, further comprising:
   delaying, by the serving base station, provision of a hybrid ARQ (automatic repeat request) feedback from the serving base station to the mobile station until the serving base station is able to determine whether or not the second base station is able to cooperate with the serving base station to process the joint uplink data so that the serving base station can successfully decode the uplink data.

7. The method of claim 1, further comprising:
   receiving, by the serving base station, a failure indication from the second base station, where the failure indication indicates that the second base station was unable to successfully decode the uplink data from the mobile station received by the second base station.

8. The method of claim 1, wherein receiving the second uplink data by the serving base station from the second base station is an indication that the second base station was able to successfully decode the uplink data from the mobile station received by the second base station.

9. The method of claim 1, further comprising:
   accessing, by the serving base station, one or more predefined rules to determine whether or not the second base station is available to perform joint processing of uplink data with the serving base station for the mobile station.

10. The method of claim 9, wherein the one or more predefined rules are based on relative values of indicators of relative strengths of signal and noise, wherein a first of the indicators is associated with wireless communication between the serving base station and the mobile station, and the second of the indicators is associated with wireless communication between the joint processing base station and the mobile station.

11. The method of claim 10, wherein the indicators comprise signal-to-interference-plus-noise ratios.

12. The method of claim 1, further comprising:
sending, by the serving base station, a second request for uplink resources of a third base station for receiving uplink data of the mobile station; and
receiving, by the serving base station from the third base station, third uplink data of the mobile station received by the third base station using the uplink resources specified by the second request.

13. An article comprising at least one machine-readable storage medium storing instructions that, upon execution, cause a serving base station to perform a method of joint uplink processing by plural base stations, comprising:
sending, by a serving base station, a request for uplink resources of a second base station for receiving uplink data of a mobile station, wherein sending the request is performed by an advance scheduler in the serving base station, the request being based on advance scheduling performed by the advance scheduler ahead of actual scheduling performed by a tactical scheduler in the serving base station;
receiving, by the serving base station, first uplink data from the mobile station;
receiving, by the serving base station from the second base station, second uplink data of the mobile station received by the second base station using the uplink resources specified by the request; and
combining, by the serving base station, the first uplink data with the second uplink data received from the second base station to derive actual uplink data sent by the mobile station.

14. A serving base station comprising:
an interface to a second base station; and
at least one processor configured to:
send a request for uplink resources of the second base station for receiving uplink data of a mobile station, wherein sending the request is performed by an advance scheduler in the serving base station, the request being based on advance scheduling performed by the advance scheduler ahead of actual scheduling performed by a tactical scheduler in the serving base station;
receive first uplink data from the mobile station;
receive, from the second base station, second uplink data of the mobile station received by the second base station using the uplink resources specified by the request; and
combine the first uplink data with the second uplink data received from the second base station to derive actual uplink data sent by the mobile station.

15. The serving base station of claim 14, wherein the at least one processor is configured to further:
send an uplink grant to the mobile station to assign uplink resources for the mobile station to send the first uplink data; and
receive the first uplink data on the uplink resources assigned by the uplink grant.

16. The serving base station of claim 15, wherein the at least one processor is configured to further:
send a suspend indication in response to receiving the first uplink data; and
after sending the suspend indication, send, to the mobile station, a request for retransmission of the first uplink data if actual uplink data cannot be recovered from combining the first and second uplink data.

17. The serving base station of claim 15, wherein the at least one processor is configured to further:
send a suspend indication in response to receiving the first uplink data; and
after sending the suspend indication, send an uplink grant to the mobile station to enable the mobile station to transmit next uplink data, in response to the serving base station being able to successfully decode actual uplink data of the mobile station.

18. The serving base station of claim 14, wherein the at least one processor is configured to further:
receive a failure indication from the second base station, where the failure indication indicates that the second base station was unable to successfully decode the uplink data from the mobile station received by the second base station.

19. The serving base station of claim 14, wherein receiving the second uplink data by the serving base station from the second base station is an indication that the second base station was able to successfully decode the uplink data from the mobile station received by the second base station.

20. The serving base station of claim 14, wherein the at least one processor is configured to further:
delay provision of a hybrid ARQ (automatic repeat request) feedback from the serving base station to the mobile station until the serving base station is able to determine whether or not the second base station is able to cooperate with the serving base station to process the joint uplink data so that the serving base station can successfully decode the uplink data.

* * * * *